US012632574B1

(12) United States Patent
Lachman

(10) Patent No.: US 12,632,574 B1
(45) Date of Patent: May 19, 2026

(54) SYSTEM, METHOD, AND COMPUTER PROGRAM FOR USING MALWARE TO DEFEND DATA

(71) Applicant: Amdocs Development Limited, Limassol (CY)

(72) Inventor: Adi Lachman, Tel Mond (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 233 days.

(21) Appl. No.: 18/220,174

(22) Filed: Jul. 10, 2023

(51) Int. Cl.
*G06F 21/60* (2013.01)

(52) U.S. Cl.
CPC .......... *G06F 21/604* (2013.01); *G06F 21/602* (2013.01)

(58) Field of Classification Search
CPC .............................. G06F 21/604; G06F 21/602
See application file for complete search history.

(56) References Cited

U.S. PATENT DOCUMENTS

| | | | |
|---|---|---|---|
| 2005/0015668 A1* | 1/2005 | Doyle | G06F 11/079 |
| | | | 714/E11.026 |
| 2010/0250497 A1* | 9/2010 | Redlich | G06Q 10/06 |
| | | | 707/661 |
| 2013/0336483 A1* | 12/2013 | Buckley | H04W 12/122 |
| | | | 380/255 |
| 2016/0183155 A1* | 6/2016 | Breuer | H04W 48/18 |
| | | | 455/437 |
| 2021/0360032 A1* | 11/2021 | Crabtree | H04L 63/20 |
| 2024/0089292 A1* | 3/2024 | Ghosh | H04L 63/20 |
| 2024/0146530 A1* | 5/2024 | Cheng | H04L 9/32 |
| 2024/0320340 A1* | 9/2024 | Vt | G06F 21/568 |
| 2024/0338425 A1* | 10/2024 | Rao | G06Q 40/04 |

FOREIGN PATENT DOCUMENTS

| | | | |
|---|---|---|---|
| WO | WO-2013095596 A1 * | 6/2013 | G06F 21/602 |

* cited by examiner

*Primary Examiner* — Linglan Edwards
*Assistant Examiner* — Jacob Benedict Knackstedt
(74) *Attorney, Agent, or Firm* — Zilka-Kotab, P.C.

(57) ABSTRACT
As described herein, a system, method, and computer program are provided for using malware to protect data. A dormant malware embedded in data detects that a preconfigured condition has been satisfied for self-activation. Responsive to detecting that the preconfigured condition has been satisfied, the dormant malware performs self-activation.

4 Claims, 4 Drawing Sheets

100

102 — detect, by a dormant malware, that a preconfigured condition has been satisfied for self-activation, wherein the malware is embedded in data 104 — responsive to detecting that the preconfigured condition has been satisfied, perform self-activation by the dormant malware

200

202    preconfigured condition indicating data has been stolen is satisfied?    NO

YES 204    perform self-activation 206    perform predefined action to protect the data

300

304

SERVER

312

TELEVISION

308

PDA

NETWORK(S)

302

306

COMPUTER

310

MOBILE
TELEPHONE

SYSTEM, METHOD, AND COMPUTER PROGRAM FOR USING MALWARE TO DEFEND DATA

FIELD OF THE INVENTION

The present invention relates to managing data stolen by a cyberattack.

BACKGROUND

Cyberattacks against organizations for the purpose of stealing data are very frequent. One popular form of cyber crime is for bad agents to steal a company's data, and then either sell it or ransom the company to prevent its sale. Companies can take measures to try and prevent this, but once the data is stolen, they lose all control over it.

For example, currently, organizations can take three measures against such attacks: first, they set up perimeter defenses, to make entry difficult. Second, they can encrypt data, such that even if it is stolen, it will not be useable. Third, they can monitor their systems to see if a breach is in progress or has occurred, so that they can react.

However, even with all three types of measures in place, it can sometimes take organizations months to discover data was stolen (usually only if and when the attacker announces it). Also, if the attackers managed to get the data and it was encrypted, they now have time to try to crack the encryption, or they can save it for decryption at a later date. Finally, there is very little deterrence to attackers; the only counter a company can take is that if the attacker is discovered and within the company's legal jurisdiction, to sue them. The attackers very frequently face little to no consequences to their attack.

There is thus a need for addressing these and/or other issues associated with the prior art. For example, there is a need to provide protection measures for data that has already been stolen by a cyberattack.

SUMMARY

As described herein, a system, method, and computer program are provided for using malware to protect data. A dormant malware embedded in data detects that a preconfigured condition has been satisfied for self-activation. Responsive to detecting that the preconfigured condition has been satisfied, the dormant malware performs self-activation.

DETAILED DESCRIPTION

Figure 1:
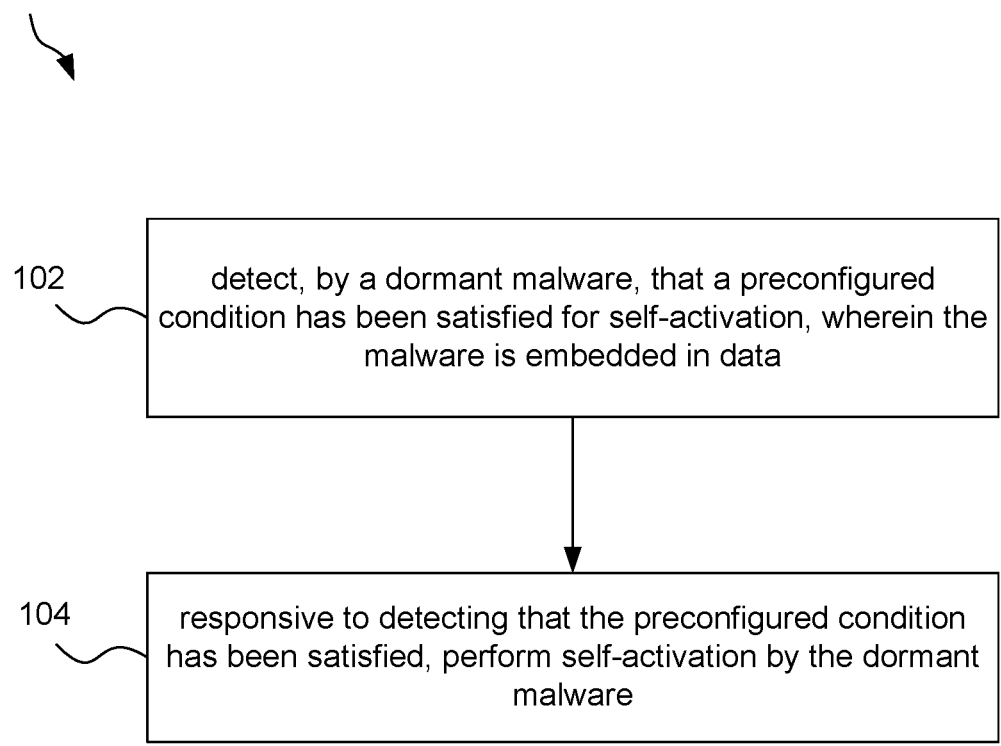
FIG. 1 illustrates a method for using malware to protect data, in accordance with one embodiment.

FIG. 1 illustrates a method 100 for using malware to protect data, in accordance with one embodiment. The method 100 may be carried out by a computer system, such as that described below with respect to FIGS. 3 and/or 4. In particular, the method 100 may be performed by malware executing on the computer system.

In operation 102, a dormant malware embedded in data detects that a preconfigured condition has been satisfied for self-activation. With respect to the present description, the malware refers to a computer program that, once activated, is configured to perform some action on a computer system that would be unwanted by an owner of the computer system, such as to disrupt, damage, or gain unauthorized access to the computer system. Also with respect to the present description, the malware is considered dormant, or in a dormant state, when the malware is not executing to perform the unwanted action. Likewise, the malware is considered activated, or in an activated state, when the malware is executing to perform the unwanted action.

As mentioned, the dormant malware is embedded in data. The data may be any data that an owner desires to protect by embedding the malware therein. For example, the data may be proprietary data of an owner (e.g. business entity, government entity, etc.). In an embodiment, the malware may be embedded in a file that includes the data.

The dormant malware is configured to detect when a preconfigured condition has been satisfied, for self-activation purposes. In other words, when the dormant malware detects that the preconfigured condition has been satisfied, the dormant malware self-activates (i.e, and is no longer dormant). The preconfigured condition may be any condition that the dormant malware is configured to detect.

In an embodiment, the preconfigured condition may include a relocation of the data (i.e. transfer of the data from a first location to a second location or copying the data at a first location for storage in a second location). In an embodiment, this relocation of the data may be an indication that the data has been stolen from an owner of the data. For example, the relocation may be indication that a cyberattack initiated by a third party has caused the data to be stolen from the owner and thus in possession by the third party.

In an embodiment, the preconfigured condition may include storage of the data at a storage location that is not a predefined location allowed for the data. In another embodiment, the preconfigured condition may include storage of the data in a network domain that is not a predefined network domain allowed for the data. For example, the dormant malware may detect when it (along with the data in which it is embedded) no longer resides in one or more predefined storage locations and/or in a predefined network domain.

In yet another embodiment, the preconfigured condition may include the dormant malware failing to receive a communication that is expected by the dormant malware. For example, the preconfigured condition may include the dormant malware failing to receive the communication from an expected source, failing to receive the communication within an expected timeframe, and/or failing to receive the communication in an expected form that includes being encrypted using a trusted encryption key.

In operation 106, responsive to detecting that the preconfigured condition has been satisfied, the dormant malware performs self-activation. Self-activation refers to transitioning from the dormant state to the activated state. To this end, the dormant malware, once activated, performs a predefined action (e.g. that would be unwanted by an owner of the computer system on which the malware is currently located).

In an embodiment, the predefined action may include sending a notification that the data was stolen. The notification may indicate an identification of the data, an identification of a source that stole the data, and/or an identification of a location at which the data currently resides.

In an embodiment, the predefined action may include making the stolen data unusable. For example, the data may be made unusable by encrypting the data. As another example, the data may be made unusable by deleting the data. As yet another example, the data may be made unusable by corrupting the data.

In an embodiment, the predefined action may include attacking a system on which the data is located. In another embodiment, the predefined action may include attacking other data stored on the system on which the data is located. For example, the predefined action may include encrypting all files in the system with a password only available to an owner of the data.

To this end, the method 100 may be performed as an offensive measure that can be used against an attacker. For example, the method 100 adds difficulties to attackers, who previously only have to consider the risk of discovery. Now, the very act of stealing data could cause them damage, so they will need to be extra careful. The added risk increases the deterrence of attack.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
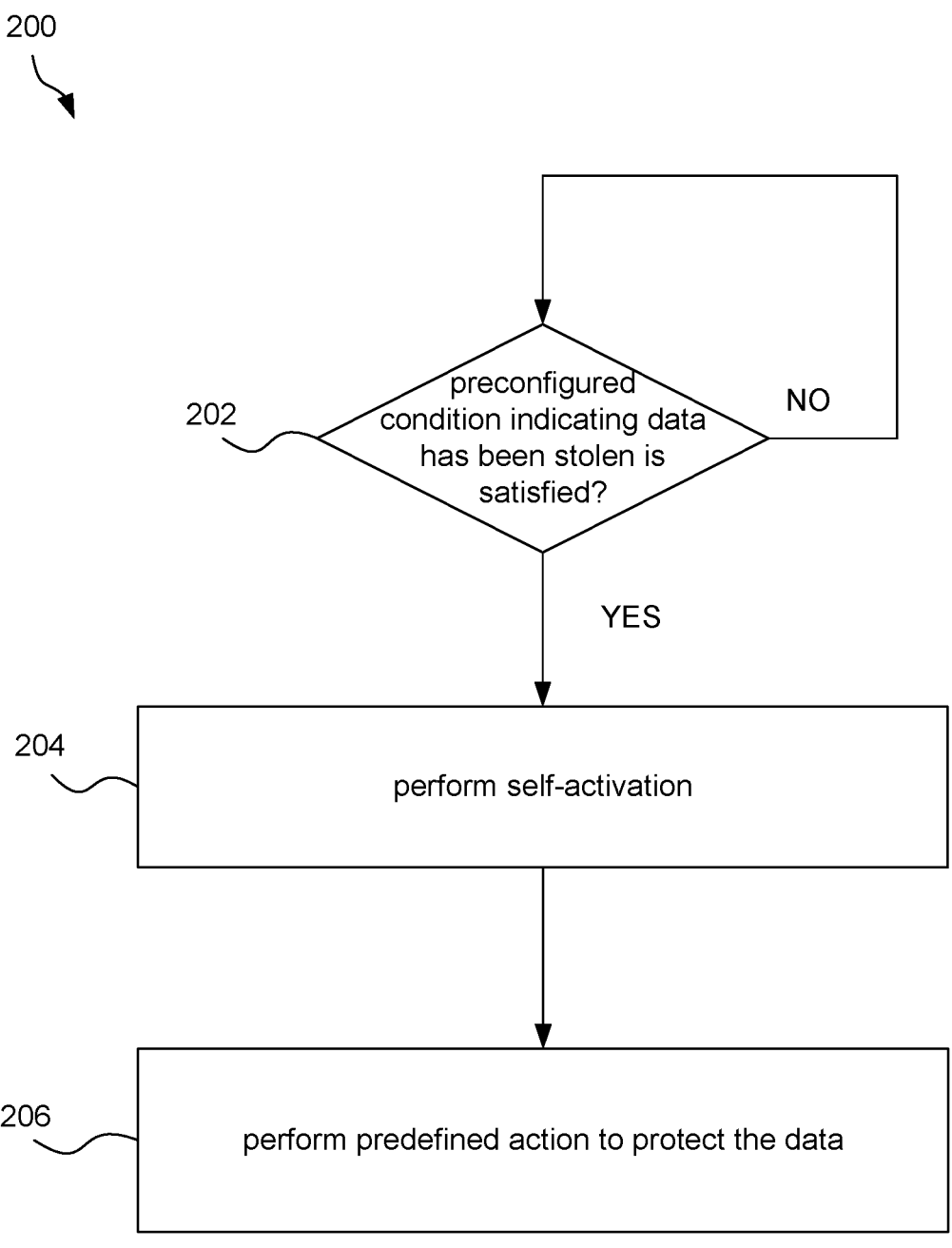
FIG. 2 illustrates a method performed by malware embedded in data for self-activation when the data has been stolen, in accordance with one embodiment.

FIG. 2 illustrates a method 200 performed by malware embedded in data for self-activation when the data has been stolen, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

The present method 200 relies on a purposeful embedding of malware in data (e.g. by an owner of the data), where the malware is configured to keep itself dormant and harmless as long as it is not triggered into activity. In particular, the malware is configured to protect the data by activating itself when it has been detected that the data has been stolen.

Initially in decision 202, the malware determines whether a preconfigured condition has been satisfied which indicates that the data has been stolen. Once it is determined that the preconfigured condition has been satisfied, the malware performs self-activation, as shown in operation 204.

The malware can be made to activate itself in a number of ways, including but not limited to:

1. The malware can be dormant so long as it resides in one or more predefined storage locations, but if it is copied to a different storage location, it activates.

2. The malware can be dormant so long as it identifies it is in a certain network domain, but once it is outside of that network domain, it activates.

3. The malware can be dormant so long as it is "pinged" periodically from a trusted source (possibly using a trusted encrypted key); once it stops receiving pings in the expected timeframe or from the expected source, it activates.

This way, if the data is copied to a location that is not answering its preconditions, the malware will be triggered to activate.

In operation 206, the malware performs a predefined action to protect the data. Once the malware activates, it can perform various actions as required, including but not limited to:

1. Send out a notification to the owner that data was stolen; specify what data was stolen; identify (as much as it can) who was the agent that stole the data and where the data currently resides.

2. Make the stolen data unusable to the attacker by some method, such as encrypting, deleting or corrupting it.

3. Attack any system or data in the attacker's environment. For example the malware can encrypt all files in the attacker's system with a password only available to the defending company.

4. The malware can maintain communication with the company's security software, giving updates and receiving commands on what to do; or act independently based on predefined instructions.

Figure 3:
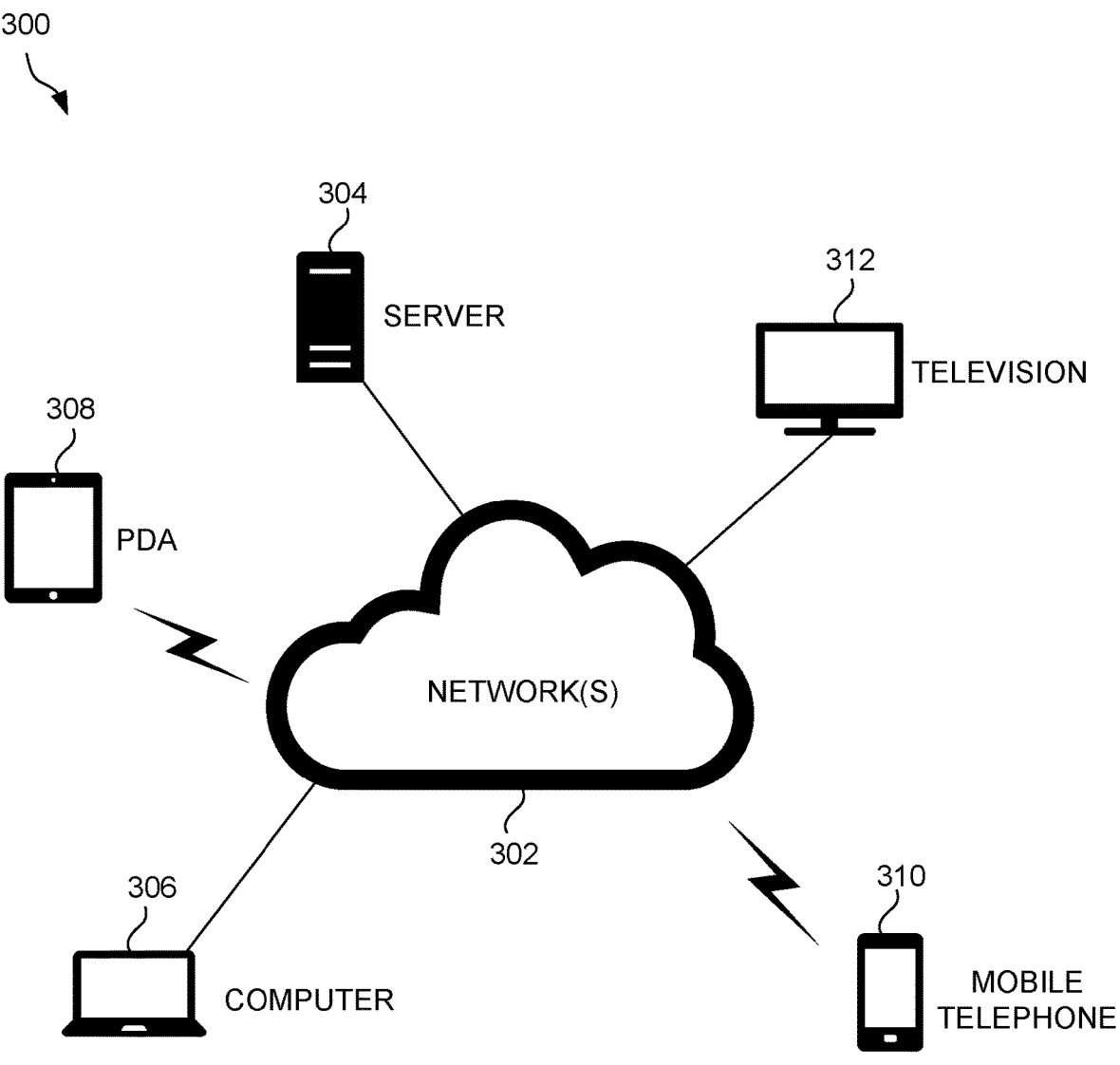
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
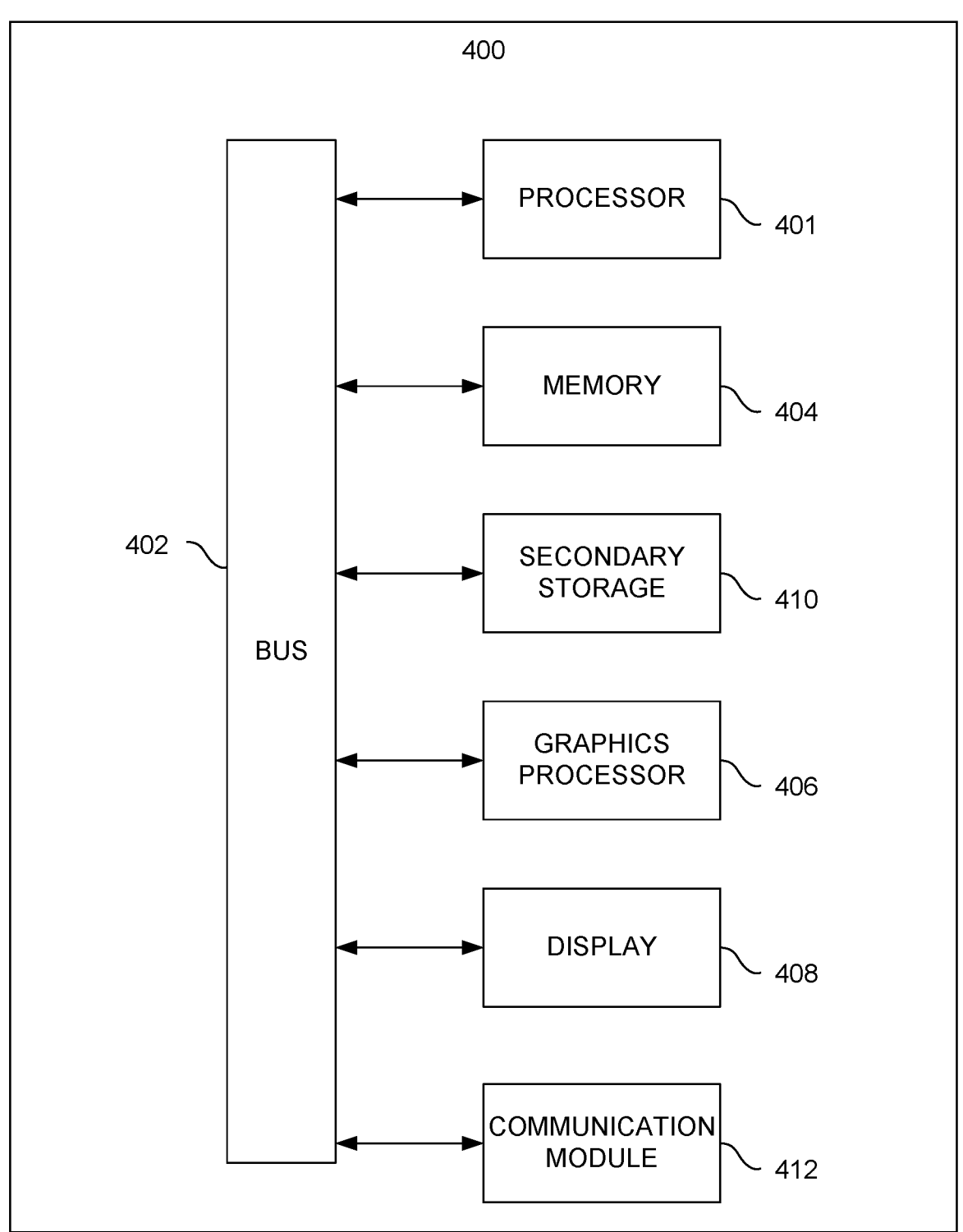
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
access a malware that is configured to be embedded in data to:
detect a theft of the data when the malware is copied to a storage location that is not a predefined location allowed for the data, and perform self-activation in response to detecting the theft to make the data unusable;

embed the malware in a file that includes the data;

detect, by the malware embedded in the file, the theft of the data by detecting that the malware has been relocated to the storage location that is not the predefined location allowed for the data;

responsive to detecting the theft of the data, perform self-activation by the malware to cause the malware to make the data unusable at the storage location that is not the predefined location allowed for the data, where the data is made unusable by one of: encrypting the data, deleting the data, or corrupting the data.

2. The non-transitory computer-readable media of claim 1, wherein the storage location is a network domain that is not a predefined network domain allowed for the data.

3. A method, comprising:

at a computer system:

accessing a malware that is configured to be embedded in data to:

detect a theft of the data when the malware is copied to a storage location that is not a predefined location allowed for the data, and perform self-activation in response to detecting the theft to make the data unusable;

embedding the malware in a file that includes the data;

detecting, by the malware embedded in the file, the theft of the data by detecting that the malware has been relocated to the storage location that is not the predefined location allowed for the data;

responsive to detecting the theft of the data, performing self-activation by the malware to cause the malware to make the data unusable at the storage location that is not the predefined location allowed for the data, where the data is made unusable by one of: encrypting the data, deleting the data, or corrupting the data.

4. A system, comprising:

a non-transitory memory storing instructions; and one or more processors in communication with the non-transitory memory that execute the instructions to:

access a malware that is configured to be embedded in data to:

detect a theft of the data when the malware is copied to a storage location that is not a predefined location allowed for the data, and perform self-activation in response to detecting the theft to make the data unusable;

embed the malware in a file that includes the data;

detect, by the malware embedded in the file, the theft of the data by detecting that the malware has been relocated to the storage location that is not the predefined location allowed for the data;

responsive to detecting the theft of the data, perform self-activation by the malware to cause the malware to make the data unusable at the storage location that is not the predefined location allowed for the data, where the data is made unusable by one of: encrypting the data, deleting the data, or corrupting the data.

* * * * *